United States Patent [19]

Trotsky et al.

[11] 4,289,568

[45] Sep. 15, 1981

[54] APPARATUS FOR AUTOMATED APPLICATION OF HEAT SENSITIVE TAPE

[75] Inventors: Alex Trotsky, Anaheim; Alan Brimmer, La Crescenta, both of Calif.

[73] Assignee: Arnold Engineering Company, Marengo, Ill.

[21] Appl. No.: 44,883

[22] Filed: Jun. 4, 1979

[51] Int. Cl.³ .................. B32B 31/00; B23P 13/00
[52] U.S. Cl. ............................ 156/518; 156/510; 156/261; 156/498; 156/520; 29/DIG. 1
[58] Field of Search ............ 156/498, 510, 513, 261, 156/224, 518, 520; 29/DIG. 1

[56] References Cited

U.S. PATENT DOCUMENTS 1,921,808  8/1933  Cohn .................................. 156/261
3,438,428  4/1969  Balamuth et al. ................. 156/498

Primary Examiner—John T. Goolkasian
Assistant Examiner—Louis Falasco
Attorney, Agent, or Firm—John K. Williamson

[57] ABSTRACT

A machine for applying particularly configured pieces of thermally-activated tape to a heated substrate, such as a continuous strip of lead frames, it is capable of long term, high speed operation without becoming fouled with tape pieces or residual adhesive. A drop-through die assembly to blank the tape pieces is mounted for reciprocal movement to and from the metal strip normally supported in spaced relation beneath the assembly. Cooling fluid is circulated through the die and stripper plate of the die assembly for dissipating heat generated in the punch during the blanking operation. This cooling feature together with the normally spaced arrangement of the die assembly and the heated substrate, serves to maintain the temperature of the punch well below the activating temperature of the tape, whereby the tendency of the punch to collect a build-up of adhesive and tape pieces is virtually eliminated.

6 Claims, 6 Drawing Figures

APPARATUS FOR AUTOMATED APPLICATION OF HEAT SENSITIVE TAPE

TECHNICAL FIELD

This invention relates to automated tape applying machines and is particularly concerned with a high speed apparatus for forming and applying predetermined shapes of heat sensitive tape to a metal web or the like, which apparatus is capable of long term, trouble-free, continuous operation.

BACKGROUND ART

In the fabrication of lead frames, for example, it has been found advantageous to apply strips of tape to the lead frame blanks during fabrication for the purpose of maintaining dimensional stability for the fragile leads. Certain types of thermally activated tape have proved to be particularly desirable in such applications because the stable adhesive in such tapes does not form deleterious contaminants in subsequent processing operations. The aforementioned processing technique is described in detail in U.S. patent application Ser. No. 852,765, entitled "A Method of Making a Lead Frame," filed Nov. 18, 1977, and owned by the assignee hereof now U.S. Pat. No. 4,204,317.

Due to the high volume, low unit cost of lead frames and similar products, it is necessary to implement the taping technique in a highly efficient manner so that the benefits realized are not offset by additional processing costs. To this end, various automated machines have been developed for simultaneously blanking and applying the pieces of heat sensitive tape to the lead frames. Typically, such machines employ a drop-through blanking die disposed above the sequentially indexed strip of lead frames to permit blanking and application in a single ram stroke. The tape supply and lead frame strip are indexed with each stroke of the ram in a manner conducive to high speed tape application.

The problem encountered with the above-described machines is that they often become clogged or fouled after only a short operating duration, requiring shutdown of the machine and thorough cleaning of the die assembly. Such fouling has been found to be the result of the collection of residual adhesive and other foreign matter on the punch of the die assembly. This progressive build up continues until the tape pieces, rather than being transferred to the lead frames as desired, are retained on the punch and drawn into the die cavity upon retraction with the return stroke of the ram. Thus, these machines are not capable of continuous high speed operation, and consequently, much of the benefit to be realized from practicing the taping technique above set out is dissipated by increased processing costs.

DISCLOSURE OF INVENTION

The present invention overcomes the problems alluded to above by the provision of a machine having unique cooling features directed to maintaining the temperature of the tape-blanking punch well below the activating temperature of the adhesive on the heat sensitive tape.

The entire die assembly is mounted for reciprocation toward and away from the heated strip such that an air space may be maintained between the die and the strip during a portion of the ram stroke. The provision of such an air space not only interrupts heat transfer from the workpiece to the assembly, but also permits air cooling of the die assembly during the time it is spaced from the underlying metal strip.

Additional temperature control for the punch is obtained by liquid cooling of the stripper plate and the die itself. Thus, as the punch passes through the stripper plate and the die, heat generated during the blanking operation and heat transferred to the punch from the workpiece is, in turn, transferred from the punch to the cooler surrounding components.

BEST MODE FOR CARRYING OUT THE INVENTION

Figure 1:
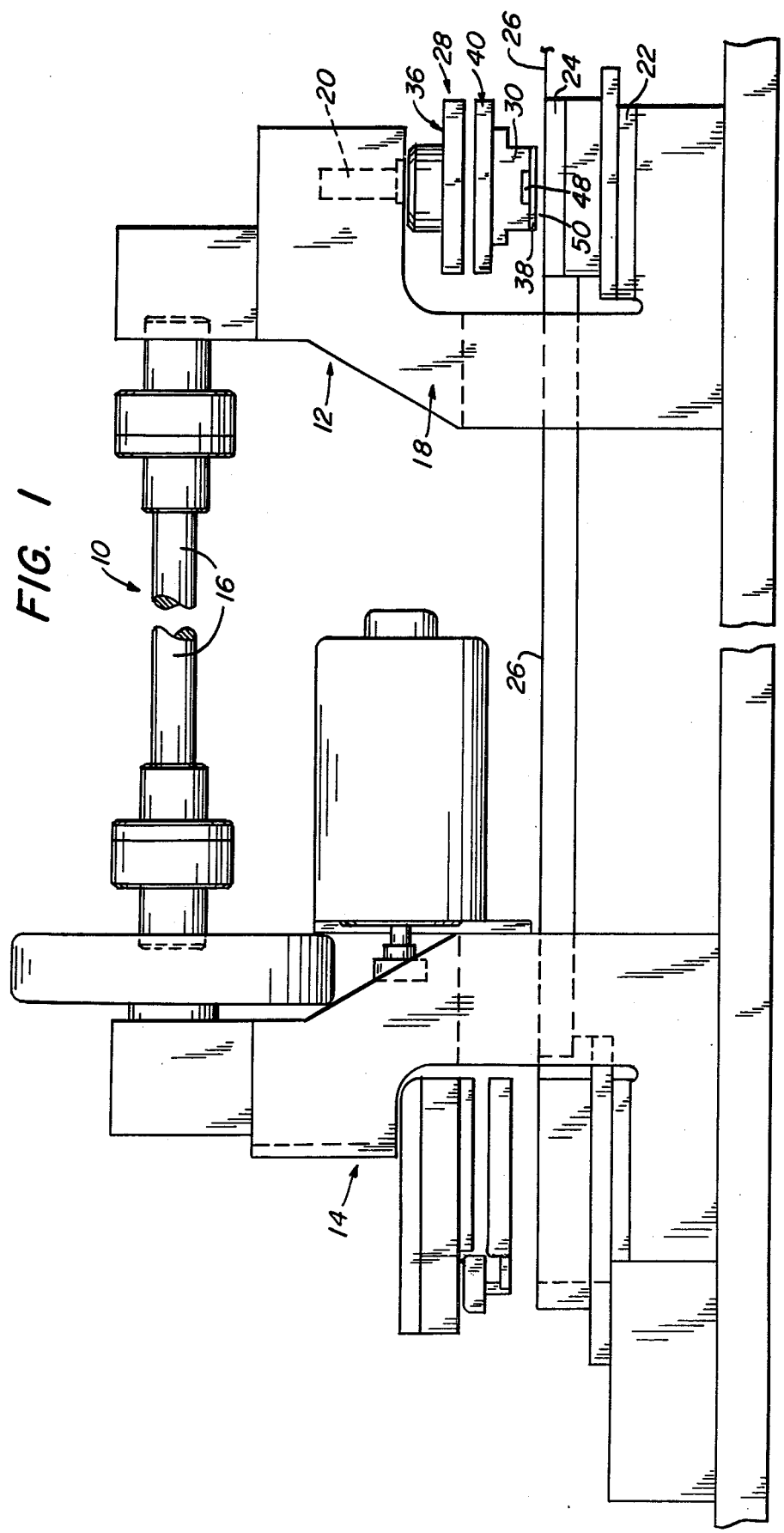
FIG. 1 is a schematic elevational view of the machine of the present invention employed in a combination taping and cut-off unit.

In FIG. 1, there is broadly shown a combination taping and cut-off unit 10 comprising an automatic taping machine 12 and a high speed cut-off apparatus 14 mechanically coupled with the taping machine 12 by a drive shaft 16. A prefabricated continuous strip of lead frames is fed into the machine 12 for application of retaining tape pieces to the leads in the frames, whereafter the strip is advanced to the apparatus 14 for cut off and separation of the leads. The apparatus 14 is of a type well known in the art for cutting a strip of lead frames into a number of segments of predetermined length, and forms no part of the present invention except for its timed operation with the taping machine 12 as will be described.

The machine 12 includes a modified conventional C-frame press 18 having a mechanically driven, vertically reciprocating ram 20 (shown only in FIG. 1). An upwardly facing, lower bolster 22 on the press 18 supports a strip guide block 24 which, in turn, receives a continuous metal strip 26 such as a web of pre-blanked lead frames.

The block 24 guides the strip 26 beneath a drop-through blanking die assembly 28 which is attached to the ram 20 for conjoint reciprocation therewith toward and away from the underlying strip 26 as will be described. The assembly 28 has a tape carrier 30 for positioning a length of heat sensitive tape 32 (shown in FIG. 6) within the assembly 28 such that tape blanks of desired configuration are formed thereby and applied to the strip 26 upon a single downward stroke of the reciprocating ram 20.

Figure 2:
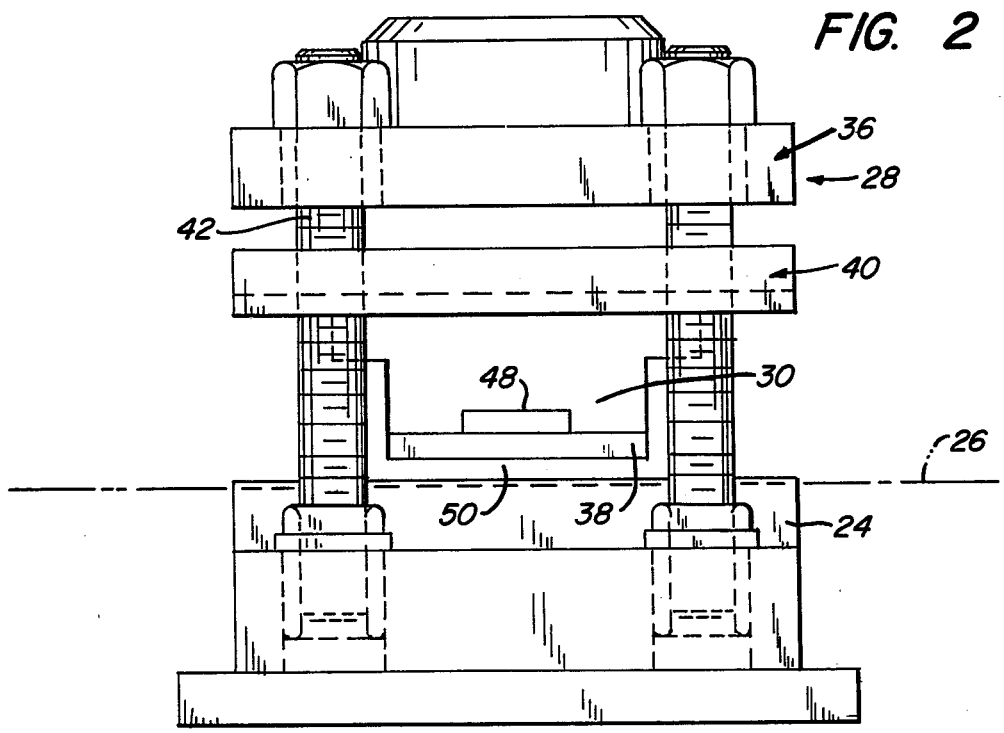
FIG. 2 is an enlarged side elevational view of the die assembly and strip support of the present invention.
Figure 3:
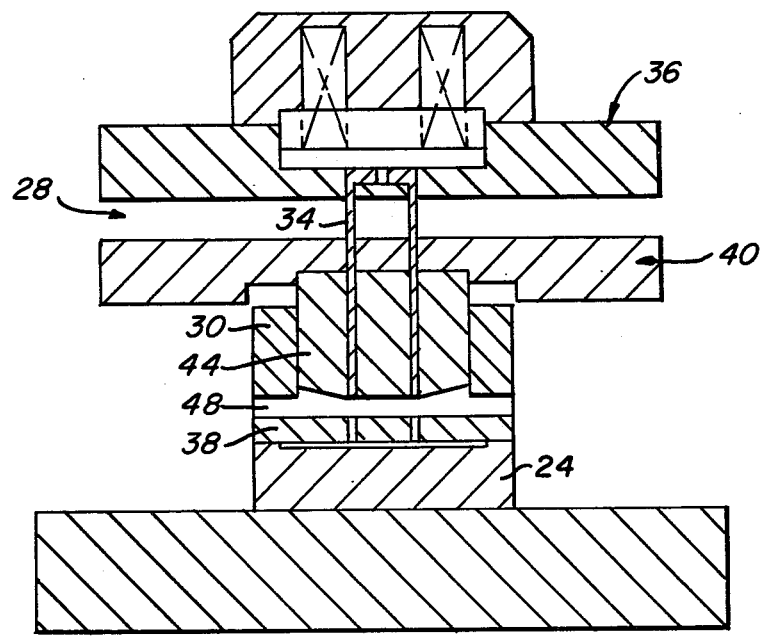
FIG. 3 is a cross sectional view taken along line 3—3 of FIG. 2 and showing the die assembly shifted against the strip support.

Considering now FIG. 2, it may be seen that the die assembly 28 is generally of conventional construction, having a punch 34 supported on an upper shoe 36, and a mating die 38 supported on a lower shoe 40. As is typical in die assemblies of this variety, the shoes 36, 40 are intercoupled in normally spaced relation for cooperable reciprocation toward and away from one another by multiple guide posts 42. The mounting of the die 38 to the lower shoe 40 is somewhat unusual in that the die is supported by the tape carrier 30 which, in turn, is shiftably attached to the shoe 40 as will be explained.

A stripper plate 44 rigidly attached to the underside of the shoe 40 is received within a complemental, vertically extending passage 46 formed in the carrier 30, and has a punch guide for permitting reciprocation of the punch 34 therethrough toward and away from the lowermost die 38. A horizontal, transversely extending slot 48 in the carrier 30 immediately above the die 38 is adapted to receive the tape 32 and position it between the stripper plate 44 and the die 38.

In a manner well known in the art, the components of the die assembly 28 are yieldably biased away from one another using springs (not shown) of differing strength, thereby permitting relative lost motion between the components upon closure of the die assembly 28. The resulting closure sequence for the assembly 28 is such that the stripper plate 44 initially moves against the die 38 to clamp the tape 32 therebetween followed by movement of the punch 34 through the die 38 for forming of the desired tape blanks.

Though not shown in the drawing, it is to be understood that the stripper plate 44 and tape carrier 30 are cooled during operation to provide temperature control for the punch 34. In preferred forms, such cooling is effected by circulating liquid coolant through internal cooling passages machined in the carrier 30 and stripper plate 44. Similarly, though again not shown, it is to be understood that the strip guide block 24 is provided with heater means of any conventional variety for maintaining the temperature of the strip 26 in the area beneath the die assembly 28 at a temperature above the activation temperature of the thermal adhesive on the tape 32.

The guide posts 42 serve not only to intercouple the shoes 36, 40, but also operate to mount the entire die assembly 28 for integral reciprocation toward and away from the block 24. As shown in FIG. 2, an air gap 50 is created between the die 38 and the guide block 24 when the die assembly 28 is shifted to the uppermost end of its reciprocal path of travel along the guide posts 42. The gap 50 is, of course, destroyed when the die 38 comes into contact with the block 24 upon the downward stroke of the ram 20; however, in preferred forms, the gap 50 is established during 25% of the ram stroke. The presence of the gap 50 interrupts heat transfer by conduction from the block 24 to the die 38 and carrier 30, as well as effecting cooling of the die 38 by ambient air. Thus, the air gap 50 cooperates with the cooling means for the carrier 30 and the stripper plate 44 to maintain the temperature of the punch 34 below that required to activate the tape 32.

Figure 6:
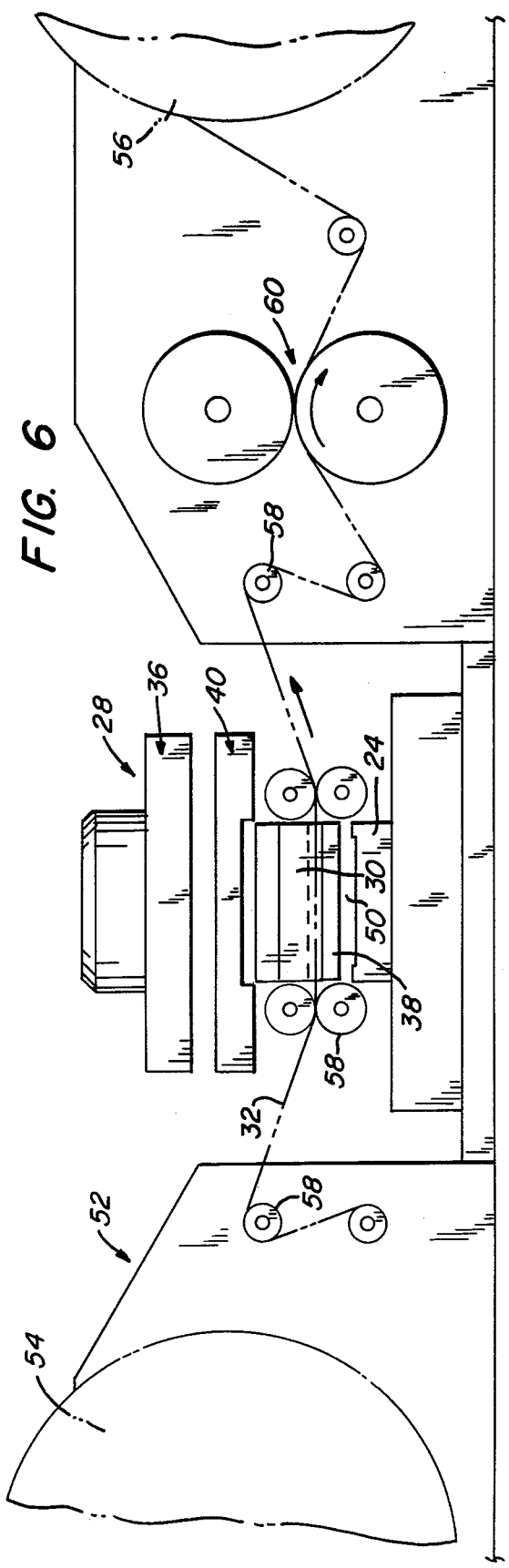
FIG. 6 is an enlarged, partial end elevational view of the invention showing the tape feed mechanism.
Figure 5:
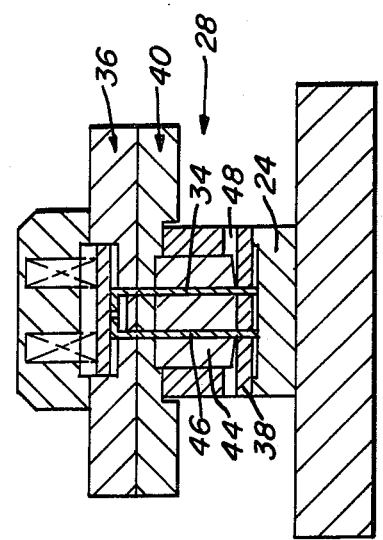
FIG. 5 is a cross sectional view as in FIG. 3, but illustrating the die assembly in its fully closed position.
Figure 4:
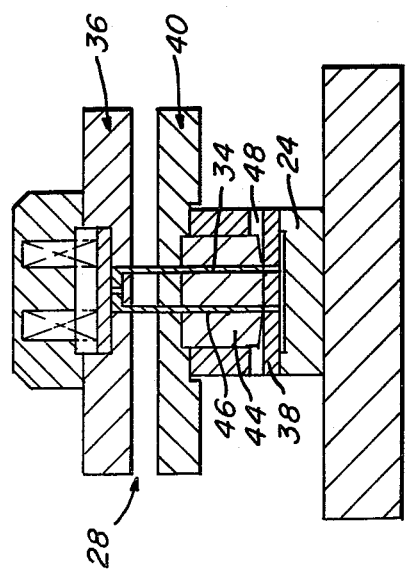
FIG. 4 is a cross sectional view as in FIG. 3, but illustrating a partially closed position of the die assembly wherein the stripper plate initially contacts the die.

Considering now FIG. 6, there is shown a tape feed mechanism 52 for sequentially directing the web of tape 32 through the slot 48 of the tape carrier 30. A reel 54 of unprocessed tape 32 is mounted for rotation about a horizontal axis on one side of the die assembly 28. A take-up reel 56, coplanar with the tape reel 54, is supported on the opposite side of the die assembly 28 for receiving the unused portion of the web of tape 32 after it passes through the assembly 28. Numerous guide rollers 58 are employed as shown for properly orienting the tape 32 relative to the tape carrier 30 during operation of the die assembly 28. Incremental movement of the tape 32 through the carrier 30 is accomplished by a driven pair of pinch rolls 60 mounted adjacent the reel 56 and having a tape-receiving bight formed therebetween for engaging the tape 32. A conventional drive (not shown) for the rolls 60 is intermittently operable in a manner well known in the art to advance the web of tape 32 a predetermined increment during the return stroke of the ram 20 when the stripper plate 44 is disengaged from the die 38. Thus, a fresh length tape 32 is positioned over the die after each reciprocation of the ram 20.

The strip 26 is also advanced along a rectilinear path of travel longitudinally of the machine 10 during each return stroke of the ram 20 by a conventional strip drive (not shown) such that blanks of tape 32 are successively applied at different desired locations on the strip. In preferred forms, the shaft 16 operates to assure that the ram 20 is driven in timed relationship to the corresponding ram in the cut-off apparatus 14.

INDUSTRIAL APPLICABILITY

The most advantageous use for the automatic taping machine 12 of the present invention is in applying retaining tape strips to the leads of a lead frame prior to their segregation such that dimensional stability is maintained for the leads. However, other applications of the present invention may prove useful in areas where automatic, high speed continuous taping is desired.

The cooling features incorporated in the die assembly 28 serve to eliminate problems experienced with similar devices heretofore available. Specifically in this regard, the air gap 50 cooperates with the liquid cooled tape carrier 30 and stripper plate 44 to maintain the punch 34 at a temperature below the activation temperature of the heat sensitive tape 32 such that undesirable accumulation of adhesive and other foreign matter on the punch 34 is greatly reduced. Thus, the die assembly 28 of the present invention is capable of trouble-free, continuous high speed operation for durations significantly greater than has been possible heretofore.

The highly efficient taping machine 12 disclosed herein permits reaping of the benefits of taping in lead frame fabrication without introducing offsetting process problems. This invention, then, represents a significant improvement over the state of the art of taping machines.

I claim:

1. Apparatus for forming and applying a particularly shaped blank of heat sensitive tape to a metal strip, said apparatus including:
   a frame;
   a stationary guide block mounted on said frame and having a track formed therein for supporting said strip;
   a drop-through blanking die assembly having a die, a mating punch, and a cooperable stripper plate;
   a tape carrier on said assembly for supporting a length of said tape in overlying relation to said die whereby said tape blank is formed upon closure of the die assembly;
   means mounting said die assembly for integral reciprocal movement to and from said strip-supporting guide block whereby an air gap is established between the block and assembly during movement of the latter;
   cooling means for maintaining the temperature of said die and said plate below the activating temperature of said tape;

said block being provided with heater means for maintaining the temperature of said strip above said activating temperature;

ram means for sequentially shifting said assembly to a position wherein said die engages said block and overlies the strip supported in said track, and then closing said die assembly such that the tape blank formed thereby is brought into contact with, and retained upon, the heated strip.

2. Apparatus as claimed in claim 1, said assembly being spaced from the block and strip for approximately 25% of said cycle.

3. Apparatus as claimed in claim 1; and a tape feed for progressively advancing a web of said tape across said tape carrier.

4. Apparatus as claimed in claim 3; and a strip drive for moving said strip along a rectilinear path of travel through said track.

5. Apparatus as claimed in claim 4; said feed advancing said tape transversely of the path of travel of said strip.

6. Apparatus as claimed in claim 1; and trim means for cutting said strip into uniform segments of preselected length, said trim means and said ram means having synchronized operating cycles.

* * * * *